United States Patent [19]

Lea et al.

[11] Patent Number: 5,705,252

[45] Date of Patent: Jan. 6, 1998

[54] EXPANDED FOAM PRODUCTS AND METHODS FOR PRODUCING THE SAME

[75] Inventors: James McKenzie Lea, Seattle; Peter Dale Haggerty, Mercer Island; Richard Charles Andler, Seattle, all of Wash.

[73] Assignee: Cascade Designs, Inc., Seattle, Wash.

[21] Appl. No.: 369,138

[22] Filed: Jan. 5, 1995

[51] Int. Cl.$^6$ .................. B32B 3/10; B32B 3/30
[52] U.S. Cl. ............... 428/133; 428/136; 428/138; 428/158; 428/159; 428/304.4
[58] Field of Search .................. 428/132, 133, 428/136, 137, 138, 158, 159, 304.4, 321.6

[56] References Cited

U.S. PATENT DOCUMENTS

| | | | |
|---|---|---|---|
| 2,588,823 | 3/1952 | Glassman | 5/361 |
| 3,655,501 | 4/1972 | Tesch | 428/136 |
| 3,775,526 | 11/1973 | Gilmore | 264/156 |
| 3,987,507 | 10/1976 | Hall | 5/338 |
| 4,194,255 | 3/1980 | Poppe | 5/481 |
| 4,306,675 | 12/1981 | Swanson | 229/42 |
| 4,879,776 | 11/1989 | Farley | 5/436 |
| 4,957,791 | 9/1990 | Richter | 428/25.5 |
| 5,007,124 | 4/1991 | Raburn et al. | 5/481 |
| 5,082,708 | 1/1992 | Kauffman et al. | 428/47 |

OTHER PUBLICATIONS

Cascade Designs' 1995 Product Catalog, pp. 13–14.

*Primary Examiner*—Marion E. McCamish
*Assistant Examiner*—Blaine R. Copenheaver
*Attorney, Agent, or Firm*—Graybeal Jackson Haley LLP

[57] ABSTRACT

An expanded resilient product and methods for making the same are disclosed. The product is characterized as a geometric solid of resilient material that has a plurality of slits formed therein. Each slit is defined by a first surface having a protruding portion and second surface having a recess portion corresponding to the protruding portion of the first surface which together form an interlocking fit between the two. Forces are applied to the product sufficient to dislodge a protruding portion of the first surface from the complementary recess portion of the second surface, thereby forming a plurality of gaps. The product is then permitted to relax, whereupon the protruding portions compressively contact the complementary recess portions of the second surface. But because of the interlocking fit, the protruding portions are prevented from re-engaging the recess portions and thereby maintain the expanded nature of the product. A method for manufacturing the product involves the creation of the slits and subsequent physical expansion of the resilient product to produce the self-sustaining gaps or apertures.

21 Claims, 4 Drawing Sheets

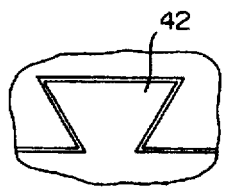
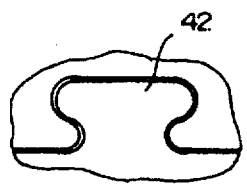
FIG. 7A  FIG. 7B  FIG. 7C
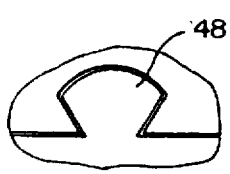
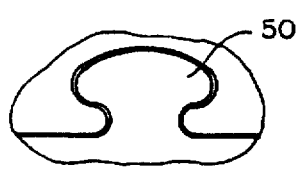
FIG. 7D  FIG. 7E  FIG. 7F
FIG. 7G
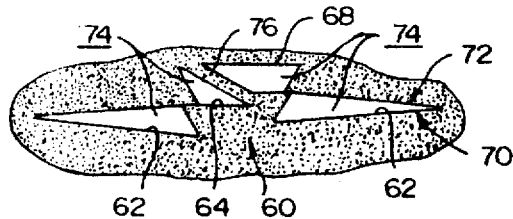
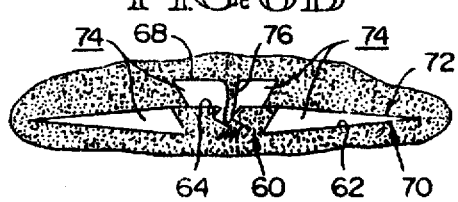
FIG. 8A  FIG. 8B
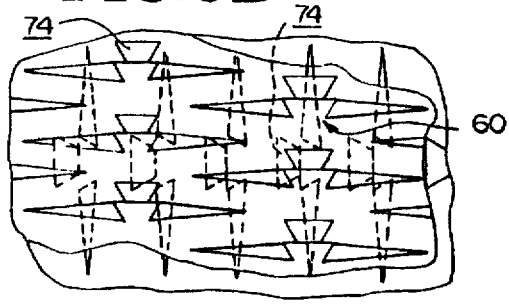
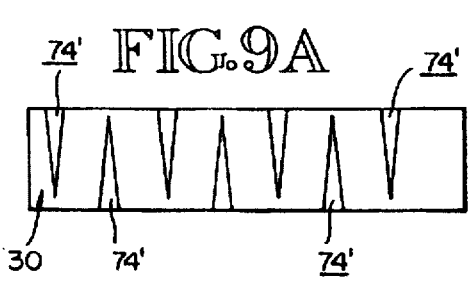
FIG. 9D  FIG. 9A
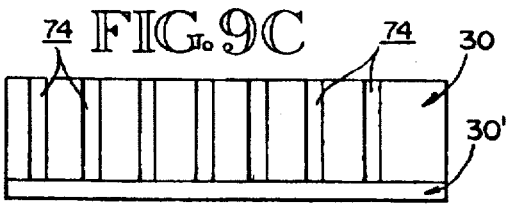
FIG. 9B  FIG. 9C

EXPANDED FOAM PRODUCTS AND METHODS FOR PRODUCING THE SAME

FIELD OF THE INVENTION

The present invention pertains to an expanded foam product and methods for making the same, and more particularly, to a foam product derived from a solid piece of foam having a plurality of slits formed therein and which is capable of sustaining an expanded state to thereby alter the effective IFD and density values thereof.

BACKGROUND OF THE INVENTION

It is well known in the field of cushioning that comfort and support are determined in large part by the amount and characteristics of the supporting material. Cushioning characteristics or the IFD value of a foam is derived by measuring the force required to reduce the thickness of a 15"×15"×4 polyurethane foam sample by 25% when depressing an 8 inch diameter disk having a surface area of approximately 50 in$^2$ thereinto. Thus, an IFD value of 40 means that 40 pounds of force on a 50 square inch disc is required to decrease an established foam sample's thickness by 25%. See ASTM D3574-91.

Current technologies and manufacturing restrictions prevent the reliable production of blown foam products having an IFD value of less than about 12 pounds. Regarding this limitation, a common solution has been to core the foam product to create collapsible voids therein. For example, a foam slab is cored to remove foam to thereby decrease its overall weight and decrease its overall effective IFD value. A significant consequence of this weight and IFD reducing methodology is the generation of unused and oftentimes unwanted foam material resulting from the coring process. It is therefore desirable to reduce and preferably eliminate the generation of this waste material. In addition, the coring process can be labor intensive compared to other processes such as slicing, stamping, or molding.

SUMMARY OF THE INVENTION

The present invention is broadly characterized as a reduced density resilient product resulting from the selective slitting of a geometric solid of resilient material wherein each slit is defined by a first surface having at least one protruding portion forming an interlocking or mating fit with an opposite and complementary recess formed by a second surface. The reduction in density occurs when the slit is expanded by, for example, the application of forces sufficient to overcome the interlocking fit between the two surfaces and to dislodge the protruding portion from the complementary recess. The aperture or gap formed as a consequence of this dislodgement is advantageously self-sustaining due to the resistance of the protruding portion of the first surface from re-engaging with the complementary recess of the second surface.

A method for manufacturing the described product comprises the steps of creating a plurality of slits in a geometric solid of resilient material wherein each slit is defined by a protruding portion on a first surface of the resilient material and interlocks with an opposite and complementary recess defined by a second surface of the resilient material; applying force to the material so as to dislodge at least one protruding portion from its complementary recess; and permitting the protruding portion to compressionally contact the second surface to thereby define a self-sustaining gap.

The foregoing modification of a solid resilient material to create self-sustaining apertures or gaps is possible in part because of the nature of resilient material. It is the ability of the protruding portion and complementary recess of the material to first, deform and dislodge or separate from each other when sufficient forces are presented, second, return to their original shape thereafter, and third, resist re-interlocking either because of friction forces or physical interference that permits the creation and maintenance of self-sustaining apertures or gaps in the resilient material without requiring coring or generating waste material in order to reduce density and IFD values. With proper selection of the slitting configuration and the initial dimensions of the slab of resilient material, a larger self-sustaining slab of the desired dimensions and density, or IFD, can be manufactured repeatedly for use in uniformally sized final products. In addition, the types of interlocking patterns that can be used are virtually unlimited. However, because each pattern has its unique attributes, one pattern may not be suitable for all applications.

From the foregoing, it can be seen that the effective density and IFD values for any given resilient material can be modified without incurring any material waste. The effective density and IFD values of a resilient material can be decreased more by creating more slits, longer slits, or longer protruding portions. In this manner, the initial IFD value of a resilient material can be modified to create "softer" material. The shape of the slits, amount of distortion when expanded, and aspect ratio of the open spaces are all significant to the characteristics of the processed resilient material and its performance in the finished product.

In preferred form, a slab of open cell foam is used and the slits are staggered so that a first row of slits is offset from a second and subsequent even rows of slits, but aligned with a third and subsequent odd rows. This alternating pattern permits sufficient extension of the foam to allow the protruding portion to dislodge from the complementary recess portion without causing undesirable distortion of the material.

A feature of the invention is the slit slab's ability to physically distort in response to compression forces, thereby causing the webs defining the apertures or gaps to collapse. When the slit slab is used for load support, compressional forces are usually applied in a direction parallel to the slit axis so as to capitalize on the column strength created by the webs. However, when the maximum load supporting force is exceeded, the web advantageously buckles and causes the aperture or gap to close when the column buckles in embodiments having sufficient sectional thickness and web dimensions. By permitting such closure, thermal convection that otherwise might be significant, is lessened by the closure of the apertures or gaps. In the field of mattresses and the like, where thermal transmission is an important factor, the ability to have a foam slab of very low IFD, yet to have high insulating values when in use, is of particular benefit.

Another feature of the invention concerns the manipulation of the slab itself into differing configurations. For example, an expanded slab having a proportionally small perimeter height can be circumvoluted to bring opposing perimeter segments into contact with one another to thereby form a cylinder of expanded material. Such a configuration can be used for insulating pipe, conduits, and the like, either alone or in combination with covering materials that surround the central bore and/or the outer perimeter of the cylinder. Conversely, a slab having a proportionally large perimeter can be put on end so as to receive compressional loading in a direction substantially aligned with the major direction of the slits to provide different IFD values.

The present invention is especially suited for use in the construction of self-inflating foam mattresses wherein light weight, low density, reasonable tensile strength, and compactibility are highly desirable. By bonding a fluid impervious skin to and about a slab of expanded resilient material, a lighter weight inflatable mattress can be created that still exhibits sufficient compressional resiliency to provide self-inflating characteristics. Moreover, use of the present invention does not significantly decrease the foam's ability to act as a tensile member as required in order to maintain the load distribution and volume characteristics necessary for such self-inflating foam filled mattresses.

These and other features of the invention will become apparent upon reading the description of the invention and inspection of the accompanying drawings as well as the appended claims.

BRIEF DESCRIPTION OF THE DRAWINGS

FIGS. 7A–G illustrate several examples of die elements which create a physical interlock between the protruding portion of the first surface and the complementary recess portion of the second surface upon compressive application to an unslit foam slab;

FIGS. 8A–B illustrate several embodiments of the invention that utilize a tether to connect the protruding portion with the receiving portion to thereby limit expansion, improve uniformity of the gaps, and increase the expanded slabs stability;

FIG. 9A is a side elevation similar to FIG. 3, except that the gaps do not extend from one surface to an opposing surface, but instead, terminate in the body of the material;

FIG. 9B is an embodiment similar to that shown in FIG. 9A, but wherein the slits are formed only on one side;

FIG. 9C illustrates a resulting product similar to that of FIG. 9B, but which is formed by combining a fully slit and a non-slit slab.

DESCRIPTION OF THE INVENTION

Figure 1:
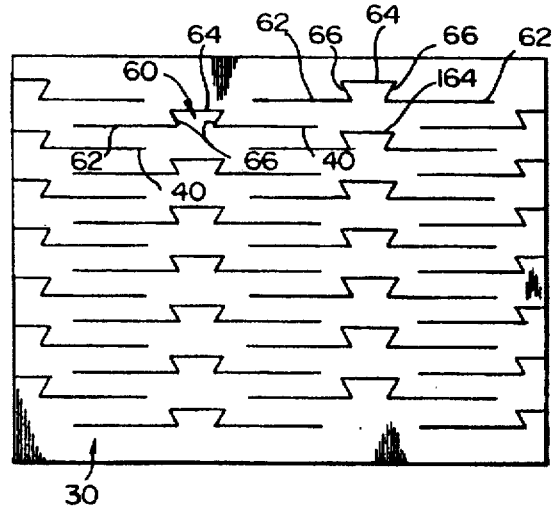
FIG. 1 is a plan view of a slab of foam material having an alternating stagger pattern of unexpanded slits.

Turning now to the several drawings wherein like numerals indicate like parts and more specifically to FIG. 1, the invention is shown in its unexpanded state. The invention is preferably derived from a single slab of open cell urethane foam 30 or other suitable lightweight and resilient material. To facilitate the creation of self-sustaining apertures or gaps, a plurality of slits 40 are formed in slab 30. As will be discussed later, the particular registry of slits 40 is not as important as the fact that each slit forms two surfaces generally normal to the major surfaces of slab 30. To aid in the discussion of the invention, the term longitudinal shall mean the direction which is substantially parallel to the predominant direction of the slits 40; the term lateral shall mean the direction which is substantially perpendicular to the predominant direction of the slits 40. Thus, in FIG. 1, longitudinal corresponds to the minor axis of the page while lateral corresponds to the major axis of the page.

Figure 1A:
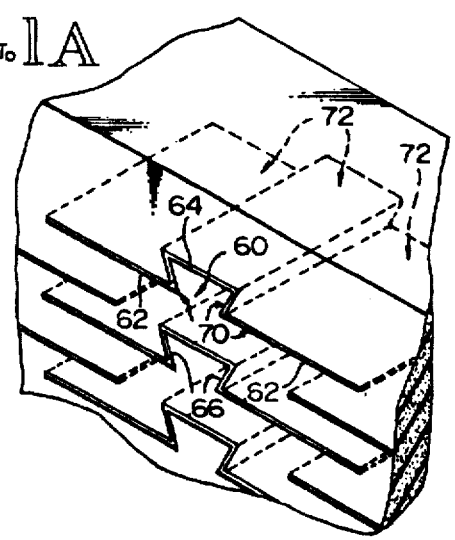
FIG. 1A is an enlarged perspective view of several slits of FIG. 1 and details the various portions of the same.

A detailed, fragmentary perspective view of several slits 40 is shown in FIG. 1A. Slit 40 is defined by first surface 70, which in part includes protruding portion 60, and by second surface 72, which in part includes complementary receiving portion 68. In order for the invention to function properly, it is important that an interlocking or interfering fit be created between protruding portion 60 and complementary receiving portion 68. This interlocking fit is preferably physical (disengagement or engagement is accomplished by physical deformation of the foam); however, it may rely solely on friction. Protruding portion 60 has in its general form head portion 64, and stem or return portion 66 connecting head portion 64 and base portion 62. To achieve the previously mentioned physical interlocking fit, it is desirous to make head portion 64 dimensionally larger than stem or return portion 66.

Figure 2A:
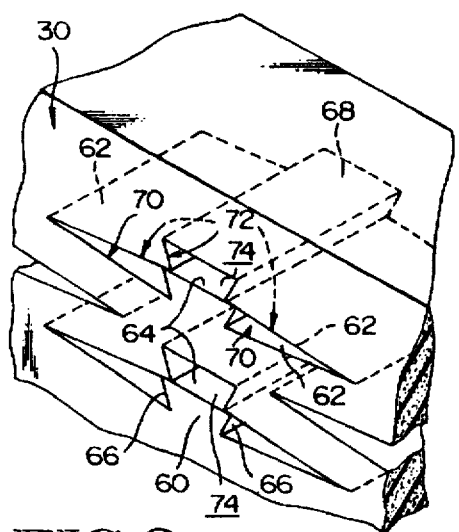
FIG. 2A is an enlarged perspective view of several apertures or gaps of FIG. 2 and details the various portions of the same.
Figure 2:
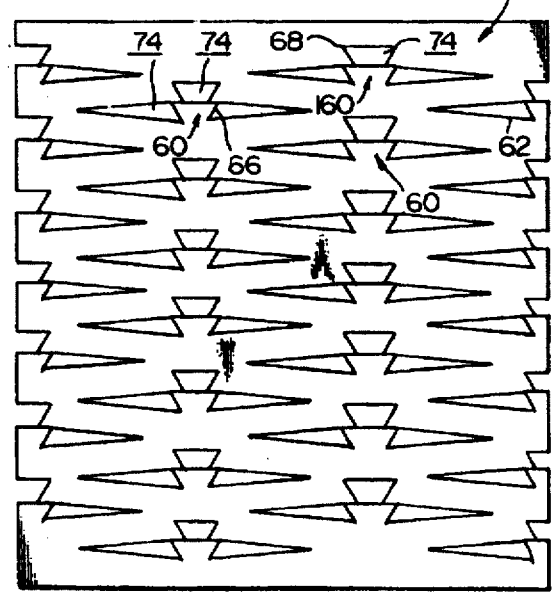
FIG. 2 shows the slab of FIG. 1 after having been laterally expanded to dislodge substantially all protrusions from their corresponding recesses and then released to allow the protrusions to interfere with the edges of the recesses to hold the gaps open.

Upon the application of generally opposing lateral force to slab 30, protruding portions 60 disengage from receiving portions 68 because of the resilient nature of slab 30, as shown in FIG. 2. While lateral forces are the most efficient, any force applied to slab 30 which results in the dislodgement of protruding portion 60 from complementary receiving portion 68 is suitable. After the lateral force has been removed, head portion 64 of each protruding portion 60 is brought to bear against base portion 62 of complementary receiving portion 68 as is also shown in greater detail in FIG. 2A. Because the resilient restoring force of the foam material used to create slab 30 is less than the force required to refit protruding portion 60 into complementary receiving portion 68, aperture or gap 74 is self-sustaining. Using the type and dimensions of slits 40 shown in FIG. 1, an approximately 30% increase in area and 30% decrease in density is achieved. In addition, the IFD is similarly reduced by approximately 30%.

It is, of course, possible to vary the degree of slab expansion by increasing or decreasing the lateral length of each stem or return portion 66, the characteristics of head portion 64, or the longitudinal length of slit 40. In addition, variation of the location and spacing of slits 40 also will affect the degree and nature of apertures or gaps formed after application of lateral displacing forces. These aspects of the invention will be discussed in greater detail below.

Figure 3:
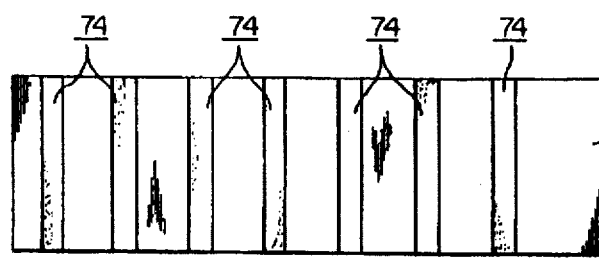
FIG. 3 is a side elevation of the slab illustrated in FIG. 2.
Figure 3A:
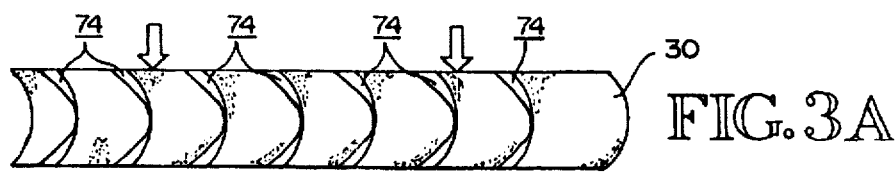
FIG. 3A is similar to FIG. 3 but shows the slab being subject to a distributed compressive force so that the webs defining the apertures or gaps collapse the same.

The elevation view of slab 30, which is shown in FIG. 3, illustrates that the apertures or gaps 74 transverse the section of slab 30 to create passages extending from one major surface to the other. However, because these passages represent only approximately 30% of the total surface area, the load bearing capacity of slab 30 remains high. Nevertheless, if sufficient loading is presented to a major surface (assuming that the opposite major surface is supported in a planar manner), the column strength associated with the slab webs is exceeded and the passages will collapse as shown in FIG. 3A. This feature of the invention is of considerable importance when the expanded slab is used in applications wherein heat transmission or convection is a design factor.

Figure 4:
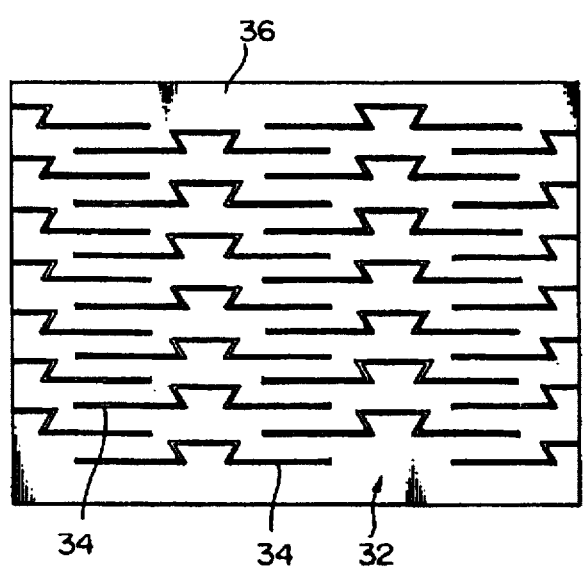
FIG. 4 is a plan view of a stamping die that may be used in creating the present invention.

In order to manufacture the reduced density resilient product, one need only choose an appropriate slit design and pattern (slit design and pattern choice will be discussed in detail below). After making these choices, an appropriate means for forming the slits in the slab must be chosen. A preferred method for creating slits in a slab of resilient material is to subject an unslitted slab of resilient material to compressive cutting elements. Either a stamping die such as shown in FIG. 4 or a rotary die cutting drum can be used. The stamping die of FIG. 4 has a plurality of cutting elements 34 arranged in the same pattern as desired to appear on a processed slab. For cuts in 1.5 inch thick foam having a low initial IFD, each cutting element 34 has a height of approximately 0.125 to 0.5 inches. Other means for creating the slit pattern in a slab include melting, water cutting, laser cutting, and knife cutting.

Figure 5:
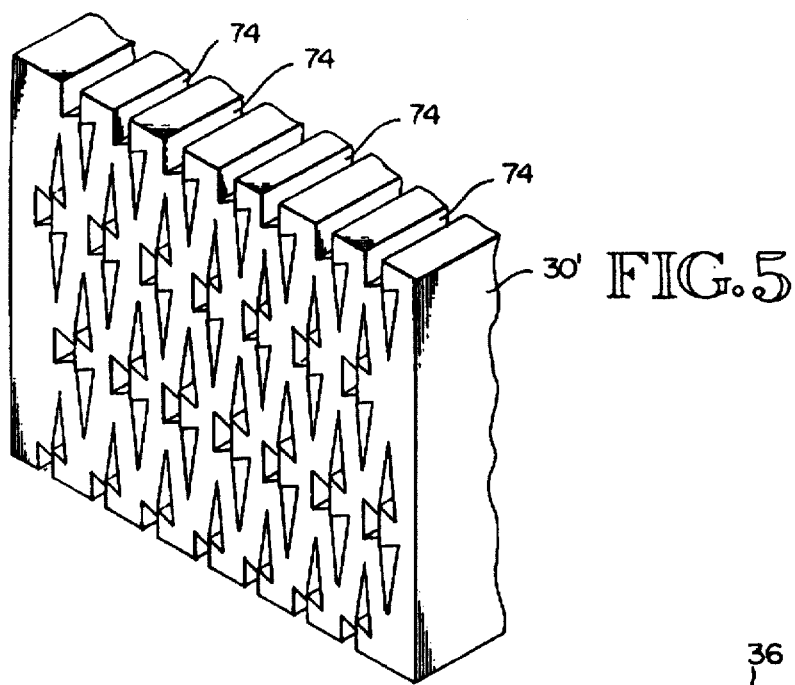
FIG. 5 shows a partial perspective view of an embodiment of the invention wherein a modified slab is oriented so as to accept compressive forces in a direction substantially aligned with the major axis of the slits.

The orientation of a slit slab 30 depends largely on the application chosen. For example, it is possible to orient slab 30 on its edge so as to receive compressive loads edge-wise or in the longitudinal direction. Due to the direction of the slit cut, longitudinal compressive loads will cause significant longitudinal collapse of slab 30 by permitting lateral bulging. In this configuration, a significant reduction in IFD can be achieved without resorting to material removal processes. As best shown in FIG. 5, resilient foam material 30' having the aforementioned properties can be created using one or more of the previously described slitting or cutting processes.

Figure 6:
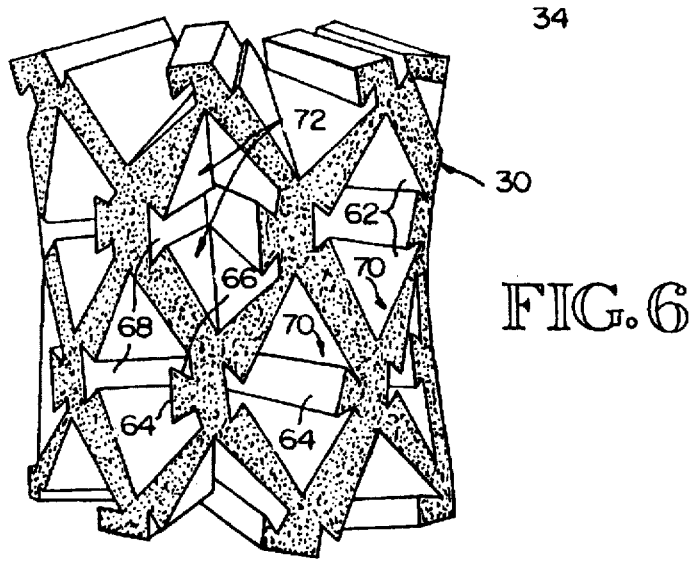
FIG. 6 shows the foam slab of FIG. 2 in a circumvoluted state so as to create a cylinder.

An alternative use for the present invention is shown in FIG. 6, wherein the slab of FIG. 1 is circumvoluted and the proximate perimeter ends are secured so as to form a cylindrical body having an open core. This embodiment of the invention can be used as insulation for pipes and the like either alone or in combination with an inner and/or outer covering. The embodiment can also be used as lightweight packing or sound insulation material.

As discussed previously, a critical concept of the invention is the interlocking fit between the protruding portion and the complementary receiving portion of the slab after formation of the slit in order to create the self-sustaining gaps or apertures that result upon the application and cessation of generally opposing lateral forces. To illustrate the diversity of possible shapes of such protruding portions, attention is drawn to FIGS. 7A–7G.

In FIG. 7A, an inverted triangular frustum protruding portion 42 is shown. Head portion 64 is linear, and stem or return portion 66 linearly tapers to base portion 62. Goblet shaped protruding portion 44 in FIG. 7B also has a linear head portion 64, but utilizes a curved stem or return portion 66. Tee shaped protruding portion 46, which is shown in FIG. 7C, emphasizes an extreme interlock configuration. Scallop shaped protruding portion 48 in FIG. 7D illustrates that head portion 64 may assume a convex or dome shape. Similarly, head portion 64 of capstan shaped protruding portion 50 of FIG. 7E shows that a convex or dome shaped head portion 64 may be used with a curved stem or return portion 66. Base portion 62' need not be linear as shown in FIG. 7F. Finally, FIG. 7G illustrates that head portion 52 may be concave and used in conjunction with base portion 62'.

Each of the foregoing embodiments of the protruding portion achieve the desired interlocking fit with its complementary receiving portion. Each embodiment achieves the desired aperture or gap formation by the same means, although the quality and characteristics of the formed gap or aperture will be different due to inherencies in the design. For example, tee shaped protruding portion 46 of FIG. 7C is much less likely to collapse back into its complementary receiving portion. However, the size of the resulting gap or aperture created by dislodgement of head portion 64 from receiving portion 68 is more likely to be collapsed by the exertion of external forces due to the nature and structural qualities of the foam forming the gap. Hence, while each gap formed will be self-sustaining, the structural properties of the surrounding material defining each gap will depend largely upon the type of interlock formed.

An additional embodiment worth noting is shown in an expanded state in FIGS. 8A and 8B wherein head portion 64 is attached to receiving portion 68 via tether portion 76. As illustrated in FIG. 8A, tether portion 76 can be characterized as an essentially linear portion of foam or a buckled portion of foam as shown in FIG. 8B. In either embodiment, tether portion 76 connecting head portion 64 to receiving portion 68 prevents foam slab 30 from over-expanding when forces are applied thereto in order to dislodge the head portions from the receiving portions. Moreover, the additional lateral tensile forces imparted by tether portion 76 further urge head portion into interfering contact with second surface 72 to thereby assure a uniformly expanded slab 30, especially when large dimension slits are utilized or the slab undergoes further modifications which are dimensionally sensitive such as during manufacture of self-inflating air mattresses.

Another factor that influences the overall performance of foam slab 30 is the arrangement of slits 40. As is shown in FIG. 1, the columnar stagger of slits 40 can be a two row offset. Depending upon design considerations, a three row offset can be used, or an irregular offset pattern can be chosen. The two row offset in FIG. 1 advantageously permits lateral displacement of protruding portions 60 from their complementary receiving portions 68 because the foam is not linearly continuous in the direction of lateral displacement, as would be the case if there was no offset at all.

It is not necessary to have slits 40 depend entirely through slab 30. FIG. 9A illustrates an embodiment wherein apertures or gaps 74' depend into, but not through, slab 30; FIG. 9B illustrates a similar embodiment wherein apertures or gaps 74' are formed in only one side of slab 30. Such embodiments may be useful in situations where thermal transmission is a significant concern or the slab must be bent easily and stay in the bent position. Alternatively, expanded slab 30 having apertures or gaps 74 can be bonded to solid slab 30' as is shown best in FIG. 9C to achieve a structure similar to that shown in FIG. 9B. Finally, two slit slabs can be stacked in an offset manner to produce a product similar to that shown in FIG. 9C in that apertures or gaps 74 do not generally depend entirely through the combined slab, but wherein both slabs are expanded. This embodiment is best shown in the plan view of FIG. 9D.

Figure 10:
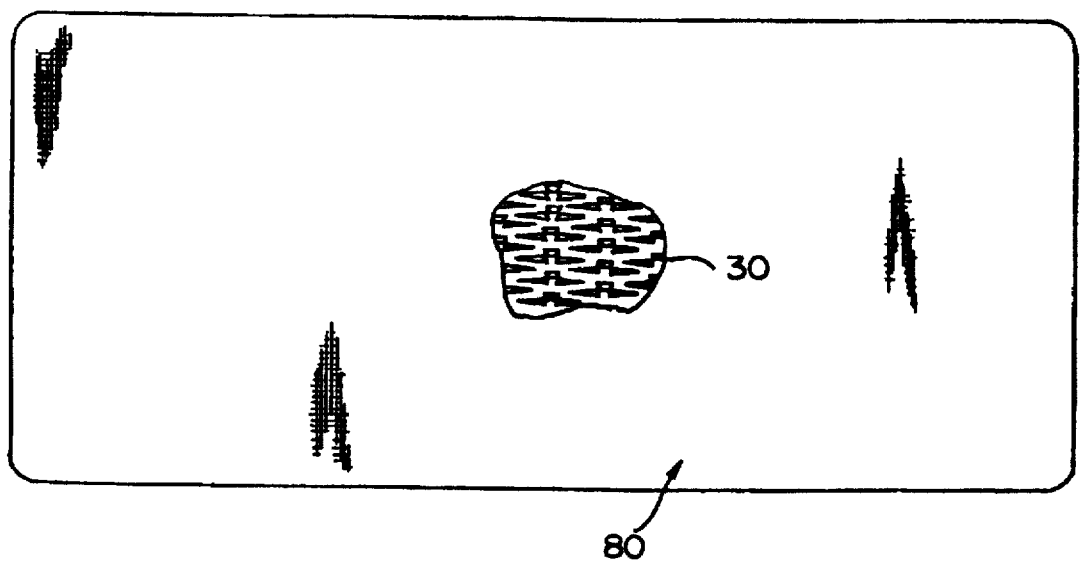
FIG. 10 is a plan view with a partial cut-away showing an expanded foam slab used in a self-inflating, air mattress or pad wherein an air-impermeable skin is bonded to the upper and lower surfaces of the expanded slab and the perimeter is sealed except for an inflation/deflation valve.

Lastly, the invention is exceptionally suited for applications that require compressional resiliency and adequate tensile strength, as well as light weight. FIG. 10 shows the invention being incorporated into a self-inflating, sealable mattress 80 commonly sold as the Therm-a-Rest® camping mattress (TAR). A detailed explanation of the technology behind the TAR can be found in U.S. Pat. No. 4,624,877, which is incorporated herein by reference.

Substitution of slabs 30 for a solid, non-slit foam slab beneficially reduces compressional stiffness, weight, and density, while enhancing its compactibility and only slightly decreasing its tensile strength. For example, by substituting slit slabs, a 13 inch wide slab can be expanded to 20 inches for use in 20 inch wide mattress applications. Consequently, the amount of foam material necessary to produce the mattress is decreased which advantageously results in a lighter mattress. It should be noted that the slab's tensile strength is reduced by about 30% in the embodiment shown in FIG. 2 when used in the embodiment of FIG. 10. This reduction in tensile strength, however, does not prevent slab 30 from being used in a TAR mattress since the reduction is within the TAR tolerance limits.

The slit orientation relative to mattress 80 in FIG. 10 is in the longitudinal direction, as opposed to the lateral direction, to provide self-inflation performance comparable to non-slit pad mattresses. Initial tests have shown that when the slits are laterally oriented, the self-inflation times are increased by approximately 350%. Initial tests also indicate that the overall insulative value for mattress 80 is within the range for a conventional TAR mattress. Moreover, the inherent collapse of the apertures or gaps in mattress 80 when subject to sufficient compressional forces as described during the discussion of FIG. 3A will permit mattress 80 to maintain a satisfactory insulative rating when in use. And, because foam material extends from one major surface to the other (except of course in the areas occupied by the apertures or gaps), these areas of foam material retain adequate tensile element aspects required in the TAR technology.

What is claimed is:

1. An expanded foam product comprising:
   a geometric solid of foam material having a plurality of slits wherein each slit is bounded by a first surface having at least one protruding portion and a base portion and wherein the protruding portion has a head portion that is connected to the base portion by a return portion that is integral with the base portion; and a second surface having a recess portion and a base portion complementary to the first surface, wherein the plurality of slits extends in a first direction from a common surface of the material thereinto and whereby upon the application of force sufficient to dislodge the protruding portion of the first surface from the complementary recess of the second surface, a plurality of self-sustaining gaps or apertures will result from the contact of the protruding portion of the first surface against the base portion of the second surface.

2. The foam product of claim 1, wherein the protruding portion of the first surface forms an interlocking physical fit with the complementary recess portion of the second surface.

3. The foam product of claim 2, wherein the protruding portion has a linear head portion.

4. The foam product of claim 2, further comprising a tether portion connected at a first end to the first surface and connected at a second end to the second surface.

5. The foam product of claim 2, wherein the protruding portion of the first surface is connected to the base portion of the first surface by a return portion, and wherein the return portion is substantially linear.

6. The foam product of claim 2, wherein the protruding portion of the first surface is connected to the base portion of the first surface by a return portion, and wherein the return portion is substantially curved.

7. The foam product of claim 1, wherein the base portion of the first surface is substantially linear.

8. The foam product of claim 1, wherein the base portion of the first surface is substantially non-linear.

9. The foam product of claim 1, wherein the resilient material has a first and second major surface bounded by a perimeter surface.

10. The foam product of claim 9, wherein the first major surface is substantially planar.

11. The foam product of claim 9, wherein the first major surface is substantially parallel with the second major surface.

12. The foam product of claim 9, wherein at least a portion of the apertures or gaps extend from the first major surface to the second major surface.

13. The foam product of claim 9, wherein the apertures or gaps extend from the first major surface but do not reach to the second major surface.

14. The foam product of claim 1, wherein the resilient material has a uniform density prior to creation of the self-sustaining gaps or apertures.

15. The foam product of claim 1, wherein the longitudinal length of the slit is approximately 2.5 inches.

16. The foam product of claim 1, wherein the plurality of slits are arranged in a repeating pattern.

17. The foam product of claim 16, wherein the repeating pattern comprises a first row of slits in columnar registry with a third and succeeding odd row of slits, and a second row of slits in columnar registry with a fourth and succeeding even row of slits so as to create an offset or staggered pattern.

18. The foam product of claim 16, wherein the repeating pattern comprises a first row of slits in columnar registry with at least another row of slits 1+3$n$, a second row of slits in columnar registry with at least another row of slits 2+3$n$, and a third row of slits in columnar registry with at least another row of slits 3+3$n$ wherein n is an integer so as to create an offset or staggered pattern.

19. An expanded foam product comprising:
    a geometric solid of foam material having a major and minor axis and having a plurality of slits wherein each slit is bounded by a first surface having at least one protruding portion connected to a base portion by a return portion, the protruding portion further having a head portion that has a width greater than the return portion, and a second surface having a recess portion and a base portion complementary to the first surface so as to create an interlocking fit between the protruding portion of the first surface and the recess portion of the second surface, and wherein the plurality of slits extends in a first direction from a first major surface of the material thereinto, and whereby upon the application of force sufficient to dislodge the head portion of the first surface from the complementary recess portion of the second surface, a plurality of self-sustaining gaps or apertures will result from the contact of the protruding portion of the first surface against the base portion of the second surface when the foam material tends to return to its original non-displaced position.

20. The foam product of claim 19, further comprising a fluid impervious membrane bonded to the foam product to form a sealed cavity containing the foam product and a valve associated with the membrane to permit the selective ingress and egress of fluid into and out of the cavity.

21. The foam product of claim 20, wherein the longitudinal direction of the slits are substantially parallel to the major axis of the slab.

* * * * *